United States Patent
Endo et al.

(10) Patent No.: US 9,906,109 B2
(45) Date of Patent: Feb. 27, 2018

(54) VIBRATION ACTUATOR

(71) Applicant: Nidec Copal Corporation, Tokyo (JP)

(72) Inventors: Masaya Endo, Tokyo (JP); Satoru Ishikawa, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 231 days.

(21) Appl. No.: 14/546,179

(22) Filed: Nov. 18, 2014

(65) Prior Publication Data

US 2015/0137628 A1 May 21, 2015

(30) Foreign Application Priority Data

Nov. 18, 2013 (JP) .................................. 2013-238282

(51) Int. Cl.
| | |
|---|---|
| *H02K 33/02* | (2006.01) |
| *H02K 33/12* | (2006.01) |
| *H02K 33/16* | (2006.01) |
| *H02K 33/00* | (2006.01) |

(52) U.S. Cl.
CPC .............. *H02K 33/16* (2013.01); *H02K 33/00* (2013.01); *H02K 33/02* (2013.01)

(58) Field of Classification Search
CPC ........ H02K 33/16; H02K 33/12; H02K 33/02; H02K 33/00
USPC .... 310/20, 23, 25, 36, 37, 38, 12.01, 15, 81
See application file for complete search history.

(56) References Cited

U.S. PATENT DOCUMENTS

| 3,542,495 | A | * | 11/1970 | Barthalon | ............. | H02K 33/02 |
| | | | | | | 310/24 |
| 6,806,603 | B1 | * | 10/2004 | Choi | ..................... | H02K 7/063 |
| | | | | | | 310/220 |
| 7,719,416 | B2 | * | 5/2010 | Arms | ..................... | B64C 27/006 |
| | | | | | | 307/151 |
| 2011/0018369 | A1 | * | 1/2011 | So | ......................... | H02K 33/16 |
| | | | | | | 310/30 |
| 2011/0133577 | A1 | * | 6/2011 | Lee | ........................ | H02K 33/18 |
| | | | | | | 310/15 |
| 2012/0169151 | A1 | * | 7/2012 | Dong | ..................... | H02K 33/16 |
| | | | | | | 310/25 |
| 2013/0169071 | A1 | * | 7/2013 | Endo | ..................... | H02K 33/02 |
| | | | | | | 310/25 |

(Continued)

FOREIGN PATENT DOCUMENTS

| JP | H5-60158 | | 8/1993 |
| JP | 2010246274 | A * | 10/2010 |
| JP | 2012-016153 | | 1/2012 |

*Primary Examiner* — John K Kim
*Assistant Examiner* — Noli Manaloto
(74) *Attorney, Agent, or Firm* — Troutman Sanders LLP (57) ABSTRACT

A vibration actuator includes: a coil having a vibration space along an axial direction; an outer case that covers the coil and that extends the vibration space in the axial direction; a movable element that comprises a magnet that vibrates within the coil and a weight unit that vibrates within the outer case and that is connected to one end side, in the axial direction, of the magnet; and an elastic member that supports elastically the vibration of the movable element in the axial direction. A resin layer is secured to an outer peripheral surface of the weight unit that faces an inner surface of the outer case. An oil film is interposed between the resin layer and the inner surface of the outer case.

5 Claims, 5 Drawing Sheets

(56) References Cited

U.S. PATENT DOCUMENTS

2013/0193779 A1\* 8/2013 Kuroda .................. H02K 33/12
310/15

\* cited by examiner

VIBRATION ACTUATOR

CROSS REFERENCE TO RELATED APPLICATION

This application claims priority under 35 U.S.C. § 119 to Japanese Patent Application No. 2013-238282, filed on Nov. 18, 2013, the entire content of which being hereby incorporated herein by reference.

FIELD OF TECHNOLOGY

The present invention relates to a vibration actuator for generating a vibration.

BACKGROUND

Mobile electronic instruments that are provided with functions for producing vibrations for informing the user noiselessly that a signal has occurred, such as an incoming message in a communication function, or a signal that is produced at the beginning/end of an operation, such as an alarm function, are well known, where such mobile electronic instruments have built-in vibration actuators.

While there are various types of mechanisms known for vibration actuators, a basic structure wherein a magnet is caused to oscillate in one axial direction, within a cylinder (bobbin) that is wound with a coil, where a movable element is structured by connecting a weight unit to this magnet, and wherein this movable element is supported elastically in one axial direction, is a known structure that is built into small mobile electronic instruments. See, for example, Japanese Unexamined Patent Application Publication No. 2012-16153, and Japanese Unexamined Utility Model Registration Application Publication No. H5-60158.

In the conventional technology set forth in Patent Citation 1, described above, a guide shaft is provided along the direction of vibration, where the guide shaft passes through this movable element and the movable element is oscillated along the guide shaft, to ensure a stable vibration. This conventional technology demonstrates superior performance in terms of vibration stability and drop impact durability, but because it is necessary to form a through hole through which to pass the guide shaft through the magnet and weight unit that structure the movable element, there is a cost involved in machining the hole in the magnet, and the mass of the wage is reduced through the formation of the through hole, making it necessary to increase the diameter or length of the weight unit in order to produce the desired mass.

In contrast, in the conventional technology set forth in the aforementioned Patent Citation 2, the structure is one wherein the movable element is guided by the inner surfaces of a cylinder, without having a guide shaft for guiding the vibration of the movable element in the one axial direction, causing a problem with the production of noise due to the movable element contacting the inner surface of the cylinder. Because the point of the vibration generating function in the mobile electronic instrument is to enable sensing of a vibration instead of informing the user via sound that a signal has arrived, it is preferable for the production of noise at the time of vibration to be kept extremely low.

In the present invention, the handling of such a situation is one example of the problem to be solved. That is, an aspect of the present invention is, for example, to provide a vibration actuator that is able to suppress the production of noise at the time of vibration while enabling the cost of machining a hole in the magnet to be eliminated and enabling a reduction in the size of the weight unit, through the use of a structure that does not have a guide shaft for guiding the vibration in the one axial direction.

SUMMARY

In order to achieve such an aspect, the vibration actuator according to the present invention is provided with the following structures, in the several inventions set forth in this Specification: a vibration actuator comprising a bobbin that is wound with a coil and that has, in the interior thereof, a vibration space along one axial direction; an outer case that covers the coil and that extends the vibration space in the axial direction; a movable element that comprises a magnet that oscillates within the bobbin and a weight unit that oscillates within the outer case and that is connected to one end side, in the axial direction, of the magnet that oscillates within the bobbin; and an elastic member for supporting elastically the vibration of the movable element in the one axial direction, wherein: a resin layer is secured to an outer peripheral surface of the weight unit that faces the inner surface of the outer case; and an oil film is interposed between the resin layer and an inner surface of the outer case.

DETAILED DESCRIPTION

The vibration actuator according to an example according to the present invention is that which produces a vibration in one axial direction through an electromagnetic driving force due to the coil and the magnet, and comprises a bobbin that is wound with a coil, an outer case that covers the coil, a movable element that oscillates in the axial direction within the bobbin and the outer case, and an elastic member for supporting elastically the vibration of the movable member. The movable element comprises the magnet and the weight unit that is connected to one axial-direction end of the magnet, where a resin layer is secured to the outer peripheral surface of the weight unit on the surface that faces the inner surface of the outer case, where an oil film is interposed between the resin layer and the inner surface of the outer case. In the vibration actuator that has such a structure, the provision of the resin layer and the oil film on the outer peripheral surface of the weight unit makes it possible to avoid the outer peripheral surface of the weight unit making direct contact with the inner surface of the outer case at the time of vibration, thus making it possible to suppress the production of noise at the time of vibration. Moreover, the use of a structure that does not have a guide shaft enables the elimination of the cost of machining a hole in the magnet and enables miniaturization of the weight unit.

An example of the present disclosure will be described below in reference to the drawings. In the drawings below, the Z-axial direction indicates the direction of the vibration axis (the "one axis"), where the mutually perpendicular directions within the plane that is perpendicular to the vibration axis (the X-Y plane) are the X-axial direction and the Y-axial direction. Moreover, in the drawings below identical codes are assigned to identical places, and redundant explanations are partially omitted.

Figure 1:
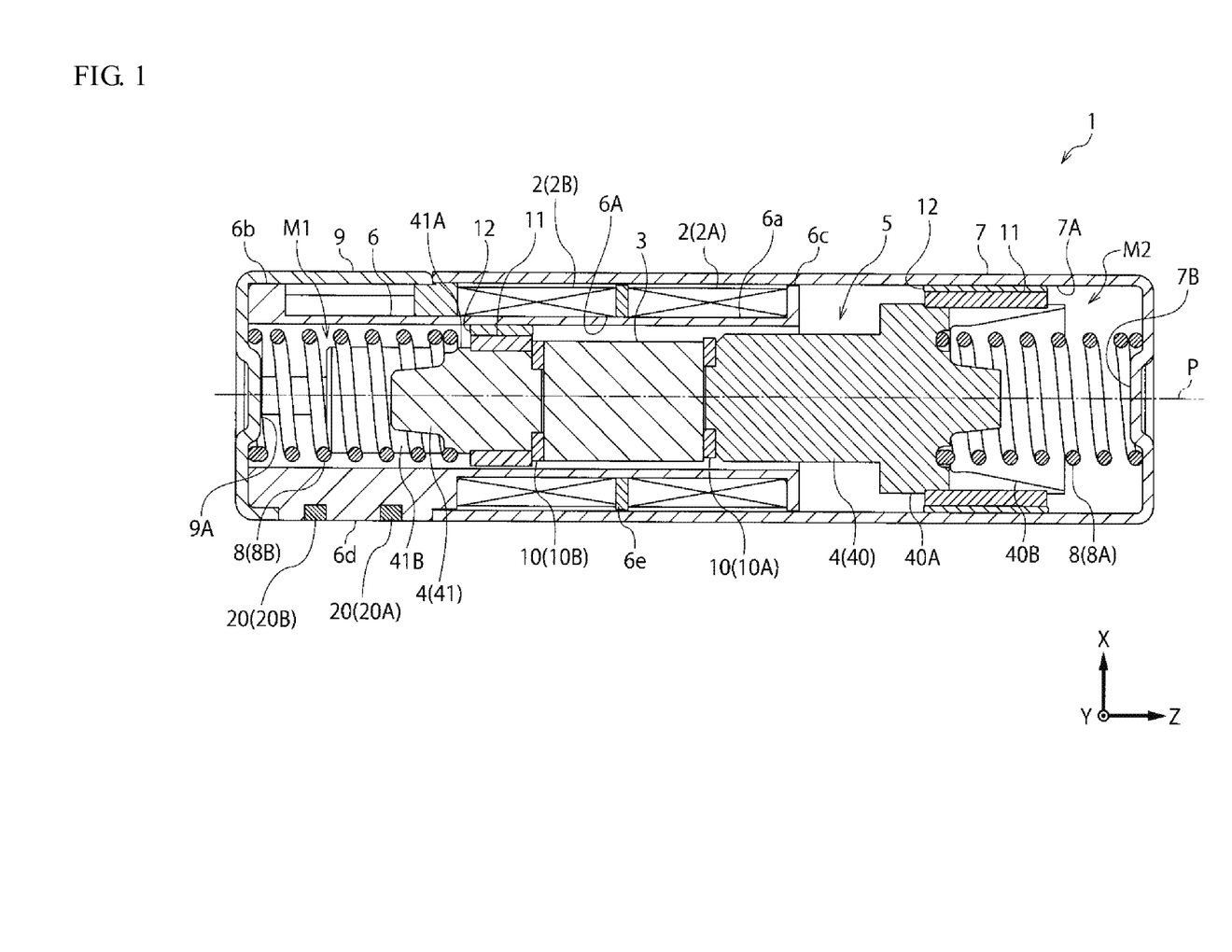
FIG. 1 is a cross-sectional diagram illustrating the overall structure of a vibration actuator according to an example according to the present invention.

FIG. 1 shows an overall cross-section of a vibration actuator according to an example according to the present invention. The vibration actuator 1 comprises a coil 2 and a magnet 3 that form a driving portion, a movable element 5 wherein a weight unit 4 is connected to the magnet 3, a bobbin 6 that is wound with a coil 2, an outer case 7 that covers the coil 2, and an elastic member 8 that provides elastic support to the movable element 5 along the vibration axis P.

The coil 2 is formed through winding a conductive wire around the vibration axis P. Here, as one example, a first coil 2A and a second coil 2B, wherein the winding directions are mutually different, are formed from a single conductive wire, where the first coil 2A and the second coil 2B are arranged lined up along the vibration axis P.

The bobbin 6 on which the coil 2 is wound is a hollow body having, therein, a vibration space M1 along the direction of the vibration axis P (the "one axis"). The vibration space M1 is a space that extends along the direction of the vibration axis P, surrounded by the inner surface 6A of the bobbin 6, where the XY cross-section thereof may be round (including elliptical and oval), or may be square. Moreover, the bobbin 6 in the figure, if necessary, may be provided with a cylindrical portion 6a that is wound with a coil 2, flanged portions 6b and 6c that are provided on both ends in the direction of the vibration axis P of the cylindrical portion 6a, a terminal block portion 6d that extends along the vibration axis P from the end portion of the flanged portion 6b, and a partitioning portion 6e wherein the first coil 2A and the second coil 2B are partitioned by the cylindrical portion 6a. The terminal block portion 6d is provided with terminals 20 (20A and 20B) to which one end and the other end of the conductive wire of the coil 2 are connected. This bobbin 6 may be formed from an insulator, such as a resin.

The outer case 7 for covering the coil 2 has, interior thereto, a vibration space M2 that extends the vibration space M1 within the bobbin 6 in the direction of the vibration axis P (the "one axis"). The vibration space M2 is a space that extends in the direction of the vibration axis P, surrounded by the inner surface 7A of the outer case 7. The outer case 7 is a cylindrical shape that is closed on one end, and covers the opening on one end side, in the vibration axial direction, of the bobbin 6. Moreover, the other end side, in the vibration axial direction, of the bobbin 6 is covered by a cover unit 9, where the coil 2, the bobbin 6, the movable element 5, and the elastic member 8 are contained within the outer case 7 and the cover unit 9. Of the outer case 7 and the cover unit 9, at least the outer case 7, which covers the coil 2, is formed from a magnetic material.

The elastic member 8 for supporting elastically the vibration of the movable element 5 in the direction of the vibration axis P (the "one axis"), in the example in the figure, comprises a first elastic member 8A for supporting within the outer case 7, and a second elastic member 8B, for supporting within the bobbin 6. The first elastic member 8A and the second elastic member 8B may be structured from, for example, coil springs that are disposed along the vibration axis P. The first elastic member 8A, on one end, engages with a supporting protrusion 7B that protrudes from the bottom portion of the outer case 7 toward the cover unit 9 side, and, on the other end, engages with one end of the movable element 5. The second elastic member 8B, on one end, engages with the other end of the movable element 5, and the other end thereof engages with a supporting protrusion 9A that protrudes from the bottom portion of the cover unit 9 toward the outer case 7 side.

The movable element 5 comprises at least the magnet 3 that oscillates within the bobbin 6 and a weight unit 4 (a first weight unit 40) within the outer case 7, where these are connected together into a single unit. In the example that is illustrated, the first weight unit 40 is connected to one end side of the magnet 3 in the direction of the vibration axis P (the "one axis"), and the second weight unit 41, which oscillates within the bobbin 6, is connected to the other end side of the magnet 3 in the direction of the vibration axis P (the "one axis"), but, as necessary, the second weight unit 41 may be omitted. Moreover, in the movable element 5, the magnet 3 and the weight units 4 (the first weight unit 40 and the second weight unit 41) are connected through yokes 10 (10A and 10B), made from a magnetic material. The magnet 3 has magnetic polar directions along the vibration axis P (where one end in the direction of the vibration axis P is a north pole and the other end is a south pole).

In the vibration actuator 1 that is structured in this way, the movable element 5 oscillates relatively along the inner surface 6A of the bobbin 6 or the inner surface 7A of the outer case 7, and the resin layer 11 is secured to the outer peripheral surface 40A of the first weight unit 40 that faces the inner surface 7A of the outer case 7, and the oil film 12 is interposed between the resin layer 11 and the inner surface 7A of the outer case 7. Moreover, if a second weight unit 41 is provided, then a resin layer 11 is secured to the outer peripheral surface 41A of the second weight unit 41 that faces the inner surface 6A of the bobbin 6, and an oil film 12 is interposed between the resin layer 11 and the inner surface 6A of the bobbin 6.

The provision of the resin layer 11 and the oil film 12 in this way enables the relative vibration of the movable element 5 within the vibration spaces M1 and M2 without the weight unit 4 contacting the inner surface 7A of the outer case 7 or the inner surface 6A of the bobbin 6 directly. At this time, the oil film 12 forms a lubricating film over the inner surfaces 6A and 7A, enabling smooth vibration of the movable element 5, and the resin layers 11 have a function for mitigating shocks to which the inner surfaces 6A and 7A are subjected, thus making it possible to effectively suppress the noise that is produced through the relative vibration of the movable element 5, through these synergistic effects. Preferably the oil that forms the oil film 12 has low viscosity so as to not cause a large resistance to the vibration of the movable element 5.

Figure 2:
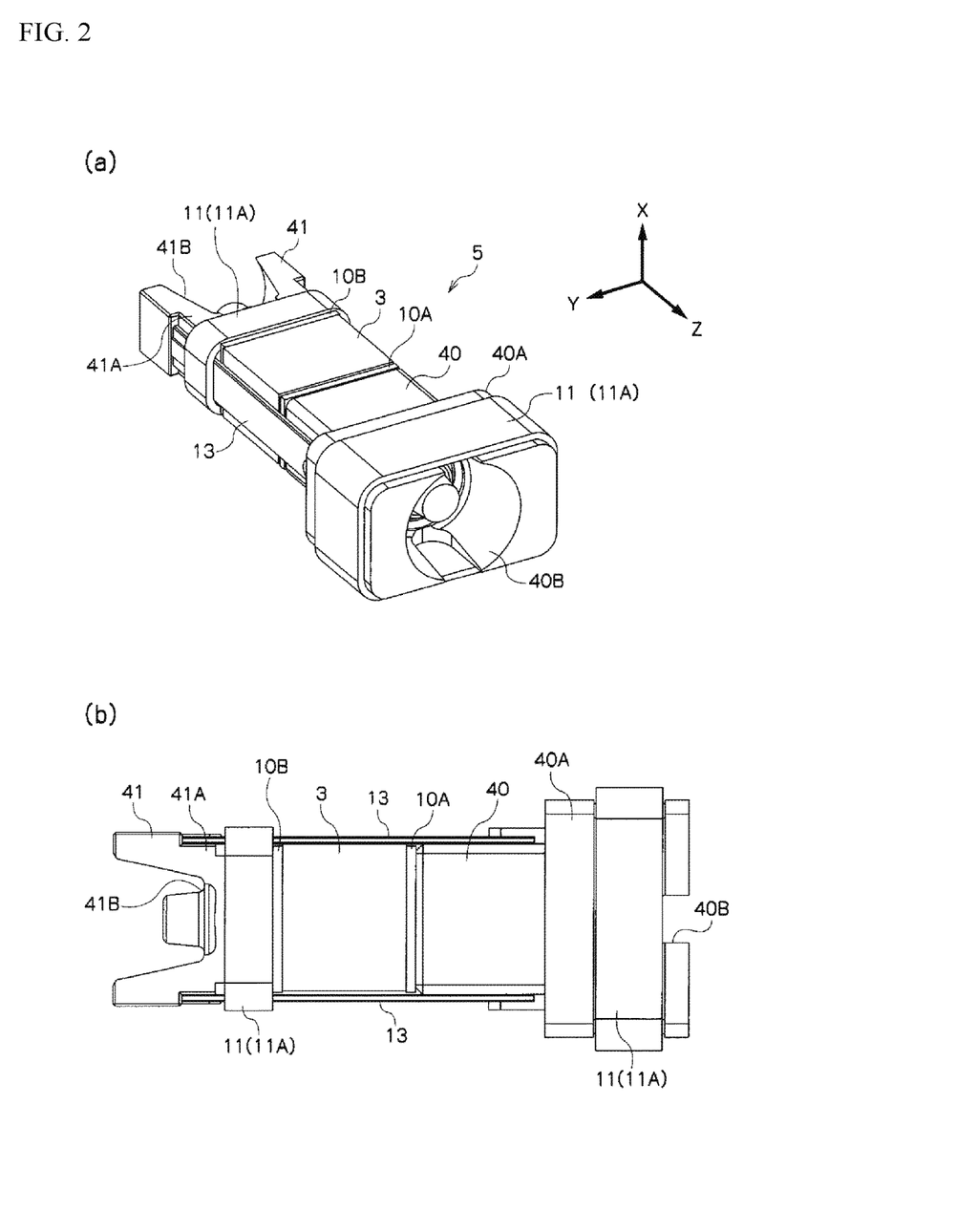
FIG. 2 is an explanatory diagram illustrating a specific example of a movable object in the vibration actuator according to the example according to the present invention (where (a) is a perspective diagram and (b) is a plan view diagram).

FIG. 2 illustrates a specific example of a movable element 5 (wherein (a) is a perspective diagram and (b) is a plan view diagram). In this example, the first weight unit 40, the magnet 3, and the second weight unit 41 of the movable element 5 are lined up in the direction of the vibration axis (the Z-axis), and are connected by the respective yokes 10A and 10B. These may be secured together into a single unit through a bonding through, for example, an adhesive agent. In order to integrate these even more strongly, a reinforcing plate 13 may be secured to the outside surfaces of the magnet 3, and the first and second weight units 40 and 41. The reinforcing plate 13 may be provided in a pair on the outside surfaces on the left and the right, and may be fastened securely through welding to the first and second weight units 40 and 41.

The resin layers 11 that are secured to the outer peripheral surfaces 40A and 41A of the first and second weight units 40 and 41 may be structured from, for example, a heat-shrink tubing 11A. The heat-shrink tubing 11A can be secured tightly to the outer peripheral surfaces 40A and 41A easily by simply placing it over the outer peripheral surfaces 40A and 41A and applying heat. Moreover, if the resin layer 11 is structured from a heat-shrink tubing 11A, then even if oil were to incur between the heat-shrink tubing 11A and the outer peripheral surfaces 40A and 41A when the oil film 12 is formed, the secured status between the heat-shrink tubing 11A and the outer peripheral surfaces 40A and 41A would still be maintained. This makes it possible to cause the high durability and the anti-noise effects to be enduring. Moreover, the heat-shrink tubing 11A is wrapped over the reinforcing plate 13, described above. This can reinforce the attachment of the reinforcing plate 13.

The first and second weight units 40 and 41 and the magnet 3 that structure the movable element 5 in the example illustrated in FIG. 2 have square cross-sections, and the second weight unit 41 has lengthwise and crosswise widths that are slightly larger than the lengthwise and crosswise widths of the magnet 3, and the first weight unit 40 has lengthwise and crosswise widths that are even larger. The outer case 7 has a square vibration space M2 wherein the first weight unit 40 is able to slide, with a small gap, relative to the movable element 5 that is formed in this way, and the bobbin 6 has square vibration space M1 wherein the second weight unit 41 is able to slide with a small gap. Moreover, the first and second weight units 40 and 41 are provided, respectively, with engaging recessed portions 40B and 41B into which fit, respectively, the end portions of the first elastic member 8A and of the second elastic member 8B.

Figure 3:
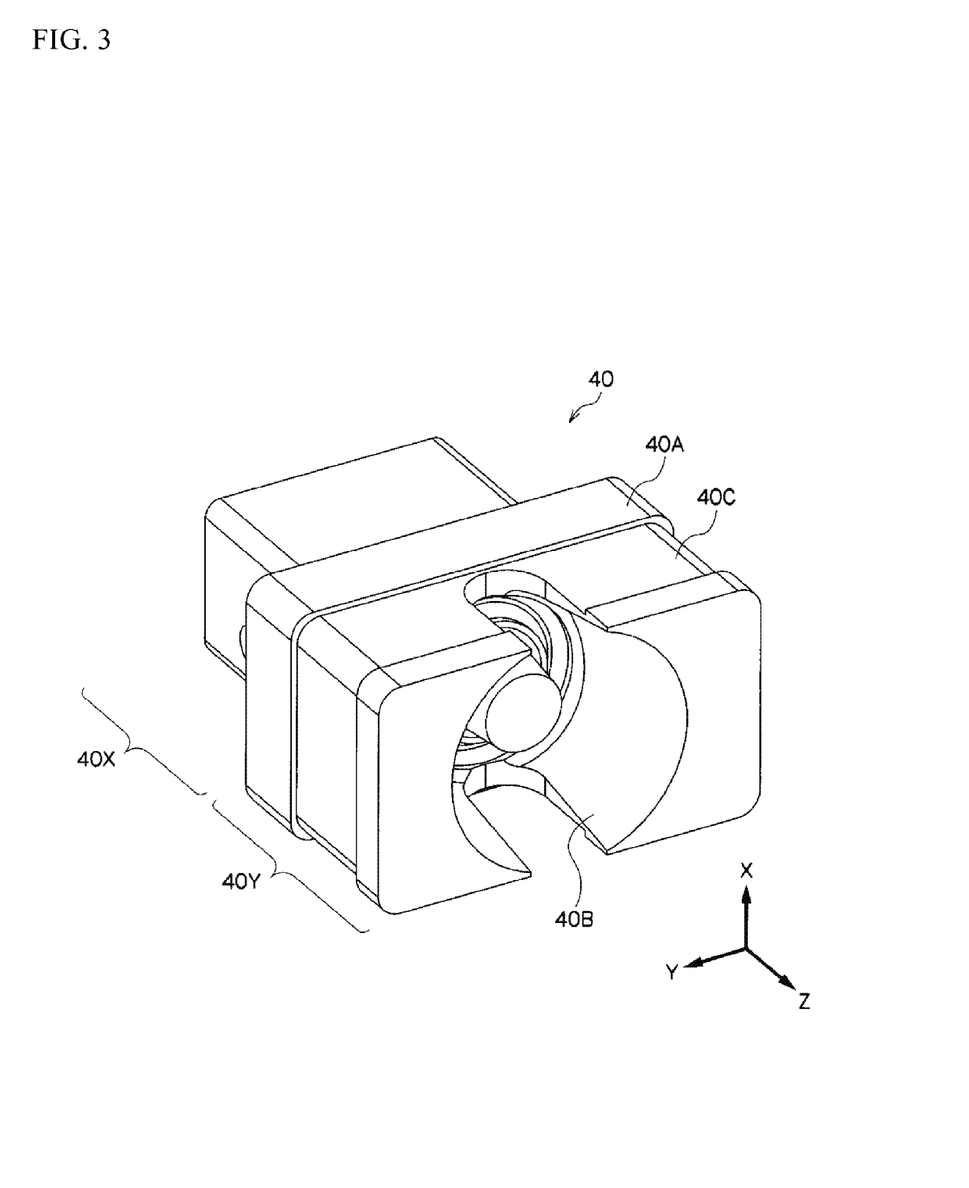
FIG. 3 is a perspective diagram illustrating a specific example of a weight unit in a movable element in the vibration actuator according to the example according to the present invention.

FIG. 3 illustrates an example configuration of the first weight unit 40. The first weight unit 40 has a small diameter portion 40X that is inserted into the bobbin 6 and a large diameter portion 40Y that is inserted into the outer case 7, where a recessed portion 40C, for securing a heat-shrink tubing 11A, is provided around the entire periphery of the outer peripheral surface 40A of the large diameter portion 40Y. The recessed portion 40C has a recession thickness that is somewhat less than the thickness of the heat-shrink tubing 11A, so that the heat-shrink tubing 11A that is secured within the recessed portion 40C will have the outer surface thereof protruding slightly relative to the outer peripheral surface 40A. The provision of the recessed portion 40C in this way makes it possible to prevent defects wherein the heat-shrink tubing 11A comes off when the heat-shrink tubing 11A contacts the inner surface 7A of the outer case 7 when the movable element 5 is oscillating, thereby enabling an increase in durability. Such a recessed portion 40C is provided similarly in the second weight unit 41 as well, enabling a further increase in durability thereby.

Figure 4:
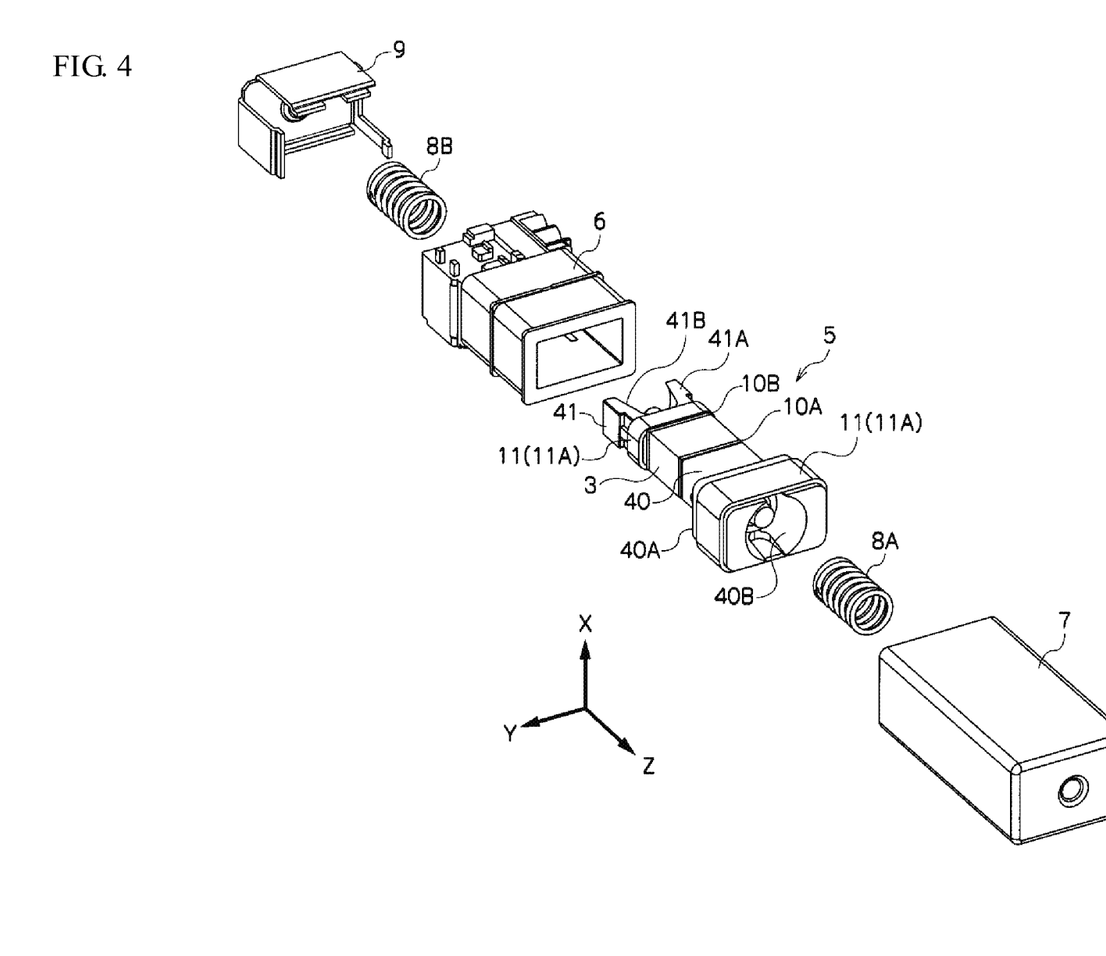
FIG. 4 is an assembly perspective diagram of a vibration actuator according to the example according to the present invention.

As illustrated in FIG. 4, the vibration actuator 1 can be assembled through sequentially assembling the outer case 7, the first elastic member 8A, the movable element 5, the bobbin 6, the second elastic member 8B, and the cover unit 9. In the movable element 5, the resin layers 11 (the heat-shrink tubing 11A) are secured to the outer peripheral surfaces 40A and 41A after first connecting together the first weight unit 40, the yoke 10A, the magnet 3, the yoke 10B, and the second weight unit 41 into a single unit. The vibration actuator 1 can be assembled by first inserting the first elastic member 8A into the outer case 7, and then inserting the movable element 5 and the bobbin 6 into the outer case 7, inserting the second elastic member 8B into the bobbin 6, and then joining the cover unit 9 to the bobbin 6.

With such a vibration actuator 1, when a driving signal is inputted into the terminals 20 (20A and 20B) to apply a current to the coil 2, the flow of the current in the coil 2 that is positioned within the magnetic field of the magnet 3 applies a thrust, in the direction of the vibration axis P, to the magnet 3, producing a vibration in the oscillating system that is structured by the elastic member 8 and the movable element 5 that are integrated with the magnet 3. Because the first coil 2A and the second coil 2B are wound in opposite directions, at this time the currents that flow in the first coil 2A and in the second coil 2B are in opposite directions, so the thrust that is produced by the magnetic field that comes out of one end, in the direction of the vibration axis P, of the magnet 3 and passes through the first coil 2A and the thrust that is produced by the magnetic field that passes through the second coil 2B to return to the other end, in the direction of the vibration axis P, of the magnet 3 can be caused to act in the same direction. This makes it possible to produce a thrust that is larger than when a coil that is wound in a single direction is used.

Additionally, the outer case 7 that covers the coil 2 is formed from a magnetic material, so it also serves as a yoke for forming a magnetic circuit, enabling an increase in the magnetic field component that cuts across coil 2 in the direction that is perpendicular to the vibration axis P, thereby making it possible to produce a thrust that effectively contributes to the vibration.

Moreover, because the vibration actuator 1 is structured without having a guide shaft, this enables elimination of the machining cost for forming the through hole through the magnet 3, and because there is no space for a through hole in the weight unit 4 either, this enables the diameter of the weight unit 4 to be reduced, making it possible to produce sufficient weight in the vibration. This makes it possible to produce a small vibration actuator 1 had a relatively low cost.

Furthermore, a resin layer 11 (heat-shrink tubing 11A) is secured to the outer peripheral surfaces 40A and 41A of the weight unit 4, which structures the movable element 5 that oscillates within the vibration space M1 within the bobbin 6 and within the vibration space M2 within the outer case 7, and an oil film 12 is interposed between the resin layer 11 (the heat-shrink tubing 11A) and the inner surface 7A of the outer case 7 and the inner surface 6A of the bobbin 6, thus effectively suppressing the production of noise during vibration while having a simple structure that does not have a guide shaft.

Figure 5:
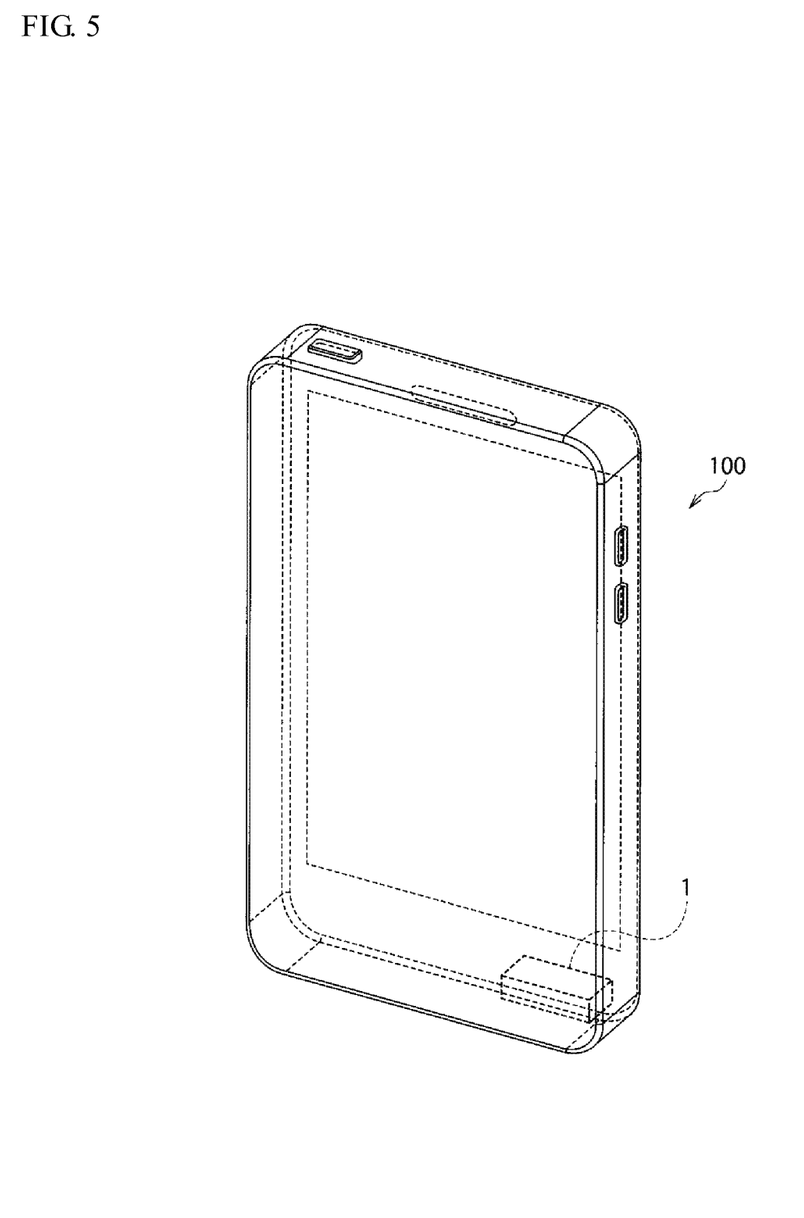
FIG. 5 is an explanatory diagram illustrating a mobile electronic instrument that is provided with the vibration actuator according to the example according to the present invention.

The vibration actuator 1 according to the examples according to the present invention may notify a user, through producing a vibration, that a signal has been produced, such as the arrival of a message in a communication function, a signal that is produced by alarm function at the beginning or ending of an operation, or the like, through being built into a mobile electronic instrument 100 (a mobile information terminal, including smart phones, tablets terminals, mobile telephones, and the like, or into a mobile audio device, mobile display device, mobile imaging device, or the like), such as illustrated in FIG. 5, for example. The production of unnecessary noise at this time can be suppressed, making it possible to use the mobile electronic instrument 100 effectively in a use scenario wherein the production of noise would be undesirable.

While the examples according to the present invention were explained in detail above referencing the drawings, the specific structure is not limited to these examples, but rather design changes, and the like, within a range that does not deviate from the spirit and intent of the present invention are also included within the present invention. Furthermore, the various examples described above may be combined together using each other's technologies insofar as there are no particular problems or contradictions with the purposes, structures, and the like, thereof.

The invention claimed is:

1. A vibration actuator comprising:
   a coil having a vibration space along an axial direction;
   an outer case that covers the coil and that extends the vibration space in the axial direction;
   a movable element that comprises
      a magnet that vibrates within the coil;
      a weight unit that vibrates within the outer case and that is connected to one end side, in the axial direction, of the magnet;
      a reinforcing plate that is secured to a side face of the weight unit and the magnet; and
      an elastic member that supports elastically the vibration of the movable element in the axial direction, wherein
   a resin layer is secured to an end portion, in the axial direction, of an outer peripheral surface of the weight unit that faces an inner surface of the outer case, wherein the resin layer comprises a heat-shrink tube wrapped onto the outer peripheral surface of the weight unit and over the reinforcing plate, and
   an oil film is interposed between the resin layer and the inner surface of the outer case.

2. The vibration actuator as set forth in claim 1, further comprising:
   a bobbin that is wound with the coil, wherein,
   with the weight unit as a first weight unit, the movable element comprises a second weight unit that is connected to the other end, in the axial direction, of the magnet and that vibrates within the bobbin,
   a resin layer is secured to an outer peripheral surface of the second weight unit, facing an inner surface of the bobbin, and
   an oil film is interposed between the resin layer and the inner surface of the bobbin.

3. The vibration actuator as set forth in claim 1, wherein, in the movable element, the magnet and the weight unit are connected through a yoke.

4. The vibration actuator as set forth in claim 1, wherein the reinforcing plate is secured through welding to the weight unit.

5. A mobile electronic instrument comprising:
   a vibration actuator comprising:
      a coil having a vibration space along an axial direction;
      an outer case that covers the coil and that extends the vibration space in the axial direction;
      a movable element that comprises
      a magnet that vibrates within the coil; and
      a weight unit that vibrates within the outer case and that is connected to one end side, in the axial direction, of the magnet;
      a reinforcing plate that is secured to a side face of the weight unit and the magnet and
      an elastic member that supports elastically the vibration of the movable element in the axial direction, wherein
   a resin layer is secured to an end portion, in the axial direction, of an outer peripheral surface of the weight unit that faces an inner surface of the outer case, wherein the resin layer comprises a heat-shrink tube wrapped onto the outer peripheral surface of the weight unit and over the reinforcing plate, and
   an oil film is interposed between the resin layer and the inner surface of the outer case.

* * * * *